United States Patent [19]

Naimpally

[11] Patent Number: 4,682,234

[45] Date of Patent: Jul. 21, 1987

[54] VIDEO NOISE REDUCTION IN PICTURE-IN-PICTURE TELEVISION RECEIVER

[75] Inventor: Saiprasad V. Naimpally, Knoxville, Tenn.

[73] Assignee: North American Philips Consumer Electronics Corp., Knoxville, Tenn.

[21] Appl. No.: 815,347

[22] Filed: Dec. 31, 1985

[51] Int. Cl.⁴ .................. H04N 5/262; H04N 9/64
[52] U.S. Cl. ........................... 358/183; 358/22; 358/181
[58] Field of Search ............... 358/181, 183, 167, 22; 455/303

[56] References Cited

U.S. PATENT DOCUMENTS

| | | | |
|---|---|---|---|
| 4,070,695 | 1/1978 | Scholz et al. | 358/181 |
| 4,139,860 | 2/1979 | Micic et al. | 358/22 |
| 4,249,211 | 2/1981 | Baba et al. | 358/183 |
| 4,267,560 | 5/1981 | Ishikawa | 358/22 |
| 4,367,484 | 1/1983 | Kuroyanagi et al. | 358/22 |

*Primary Examiner*—Howard W. Britton
*Assistant Examiner*—John K. Peng
*Attorney, Agent, or Firm*—Thomas A. Briody; William J. Streeter; Marianne R. Rich

[57] ABSTRACT

When the second channel in a picture-in-picture (PIP) receiver is turned off by the user, it is automatically tuned to the station selected for the first channel. Both channels thus process a signal having the same picture information. After partial processing, the two signals are averaged, creating a signal which has the same picture signal components but substantially reduced noise components. This reduced noise signal is then subjected to the remaining standard processing in the first channel and applied to the picture tube.

6 Claims, 2 Drawing Figures

VIDEO NOISE REDUCTION IN PICTURE-IN-PICTURE TELEVISION RECEIVER

BACKGROUND OF THE INVENTION

1. Field of the Invention

The present invention relates to color television receivers and, more particularly, to color television receivers in which a second picture is displayed within or alongside the main picture.

2. Description of the Prior Art

Television receivers are known in which a second channel is provided which processes a second user-selected televison signal, the processed signals from the main and second channels subsequently being combined to create a display which contains both pictures either side by side or, more typically, one within the other. Television receivers of this kind are provided with a switch in which the picture-in-picture feature may be turned off. When that occurs, the television receiver is, essentially, a standard single channel receiver. In such receivers, the quality of the picture is often adversely affected by the presence of random noise.

SUMMARY OF THE INVENTION

It is an object of the present invention to reduce the noise level in the main television picture by utilizing the available second channel when the user has chosen to view only the main picture. The picture invention is based on the realization that the picture content of the first and second channels will be the same if both channels are tuned to the same station, but that, if the two channels are combined, the random noise will tend to be reduced by a factor of 3dB.

According to the present invention, when the user indicates only the main channel will be viewed, the second channel in the television receiver is automatically tuned to the station selected on the main channel. Both signals are then subjected to processing and, thereafter, are combined, for example in an averaging circuit. The combined signal is then applied to the output processing stages of the main channel and, finally, to the display device. The resultant picture has the selected picture content, but a reduced noise level.

In a preferred embodiment, the input processing consists of demodulation to the intermediate frequency, amplitude and phase compensation, and delay matching to synchronize the two television signals. The output processor, i.e. the processor operating on the combined signal, includes a decoder which furnishes the color difference signals as well as the luminance signal, and a matrix generating the final color signals from the color difference signals and the luminance signal.

Alternatively, the decoder can be part of the input processor. The amplitude and phase compensating stages as well as the delay matching for synchronization must then be provided individually for each output of the color decoder. A plurality of combining stages must then combine corresponding outputs of pairs of color decoders, the outputs of the combining stages being applied to the matrix which furnishes the final color signals.

For simplicity, the present invention is being described in two embodiments implemented in hardware. It is clearly within the competence of one skilled in the art to effect the same operation in a software implementation. This implementation is therefore to be considered included within the scope of the present invention.

DESCRIPTION OF THE PREFERRED EMBODIMENTS

Figure 1:
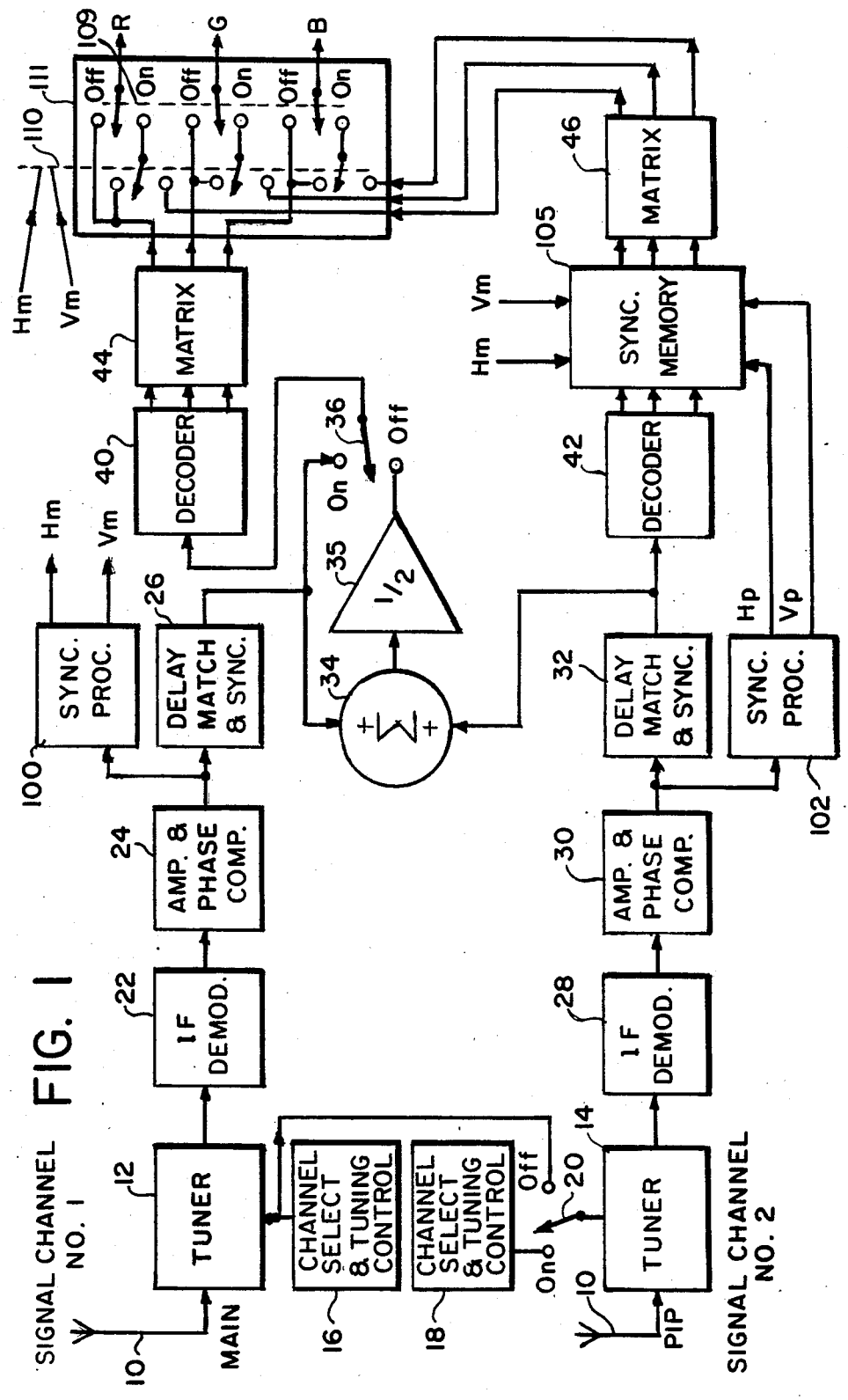
FIG. 1 is a schematic block diagram of a first embodiment of the present invention.

Referring now to FIG. 1, an antenna 10 supplies signals both to a main channel tuner 12 and a second channel tuner 14. A user operable channel selector 16, also provided with a tuning control, is connected to tuner 12. A similar unit 18 is connected to tuner 14 when a switch 20 is in the "on" position, illustrated with a solid line in FIG. 1. When switch 20 is in the "off" position, as illustrated with dashed lines, tuner 14 is connected to the output of channel selector 16.

Tuner 12 and channel selector 16 together constitute first tuning means, while tuner 14 and channel selector 18 together constitute second timing means.

The output of tuner 12 is connected to a demodulator stage 22 which furnishes a baseband video signal. The video signal is amplitude and phase coompensated and subjected to a controllable delay in stages 24 and 26, respectively. Stages 22, 24 and 26 constitute initial processing means of the first (main channel) processing means in this embodiment, while stages 44, 40 described below are the corresponding final processing means. Similarly, the output of tuner 14 is subject to demodulation in a demodulator stage 28. The output of demodulator stage 28 is subjected to amplitude and phase compensation in a unit 30 and delayed suitably for synchronization with the output of delay unit 26 in a delay unit 32. Stages 28, 30 and 32 constitute initial processing means of the second processing means, stages 42, 105 and 46 being the corresponding final processing means. Delay units 26 and 32 are effective in synchronizing minor time delay variations in two nominally identical channels and are useful only in a non-PIP mode. The output of delay unit 26 is applied to first input of a summing stage 34. Similarly, the output of delay unit 32 is applied to a second input of summing stage 34. The output of summing stage 34 is connected to the input of a "divide by two" stage 35. Stages 34 and 35 together constitute combining means. A decoder stage 40 receives as input either the output of stage 26 when a switch 36 is in an "on" position or the output of "divide-by-two" stage 35 when switch 36 is in an "OFF" position. Sync processing stages 100 and 102 receive video signals from stages 24 and 30 respectively. Stage 100 delivers horizontal and vertical synchronization signals Hm and Vm respectively. Vertical and horizontal sync signals Vp and Hp are output by stage 102. The output of stage 32 is also connected to a decoder 42 whose outputs are fed to a synchronization memory 105 which synchronizes the PIP (second) video signal to the main (first) video signal. The outputs of stage 105 are matrixed to RGB signals by a matrix stage 46 and supplied to a switching stage 111. Similarly, the outputs of stage 40 are matrixed to RGB signals by matrix stage 44 and delivered to switching stage 111, a preferred embodiment of output selector means. A ganged switch 110 in stage 111 chooses between the Main or PIP channel RGB signals based on commands derived through signals Hm and Vm. The so-selected RGB main or PIP channel signals are applied to respective "ON" terminals of a selector switch 109. The "OFF" terminals of selectors switch 109 are connected to respective outputs of matrix stage 44. The RGB signal outputs of stage 109 are color signals suitable for application to the display device e.g., a picture tube (not shown).

The above-described apparatus operates as follows:

Switch 20 is the user-operated selector switch which determines whether the second picture (PIP) is or is not going to be displayed. If the viewer chooses to view the picture-in-picture, switches 20, 36, 109 are still in the "on" position and the television receiver operates in its normal mode of operation. This will not be described in detail here, but tuners 12 and 14 are tuned to the channels respectively selected by channel selectors 16 and 18. The outputs of tuners 12 and 14 are, respectively, demodulated in stages 22 and 28. The baseband outputs of stages 22 and 28 are subjected to amplitude and phase compensation in stages 24 and 30, respectively. Sync processing stages 100 and 102 deliver horizontal and vertical sync signals corresponding to the two channels to a synchronization memory stage 105. The processed PIP channel signal is decoded in decoder 42 and compressed and synchronized in stage 105 to the main channel. Thus the output signal of stage 105 are a compressed version of the Picture-in-Picture (PIP) signal, synchronized in time to the main channel. These signals are matrixed to RGB and fed to a switch arrangement 111. When switches 36 and 109 are in the "ON" position, the RGB output signals of stage 111 consist of the PIP signals shown in compressed form within the main signals.

The above, as mentioned before, constitutes the normal operation of a television receiver having picture-in-picture capability. The present invention really only comes into play when the viewer decides to view only the main picture. Under this condition, switches 20, 36 and 109 are in the "off" position. When switch 20 is in the "off" position, the output of channel selector 16 is connected to tuner 14. Tuner 14 is tuned to the same channel as tuner 12 and the same video signal is processed in the input processing stages of both channels. The partially processed television signals at the outputs of the respective input processing stages are applied to respective inputs of a summing circuit 34. The output of summing circuit 34 is thus a signal having twice the normal signal amplitude, but a decreased noise level since the random noise power in the two signals cancels by a factor of 2. This noise-reduced signal is then applied to "divide by two" stage 35, at the output of which a television signal having the normal signal amplitude but a decreased noise level is found. This signal is then applied to the output processing stages, namely decoder 40 and matrix 44, of the main channel. Subsequently, it is delivered unaltered through switching stage 111 as the final RGB signals for the display.

Figure 2:
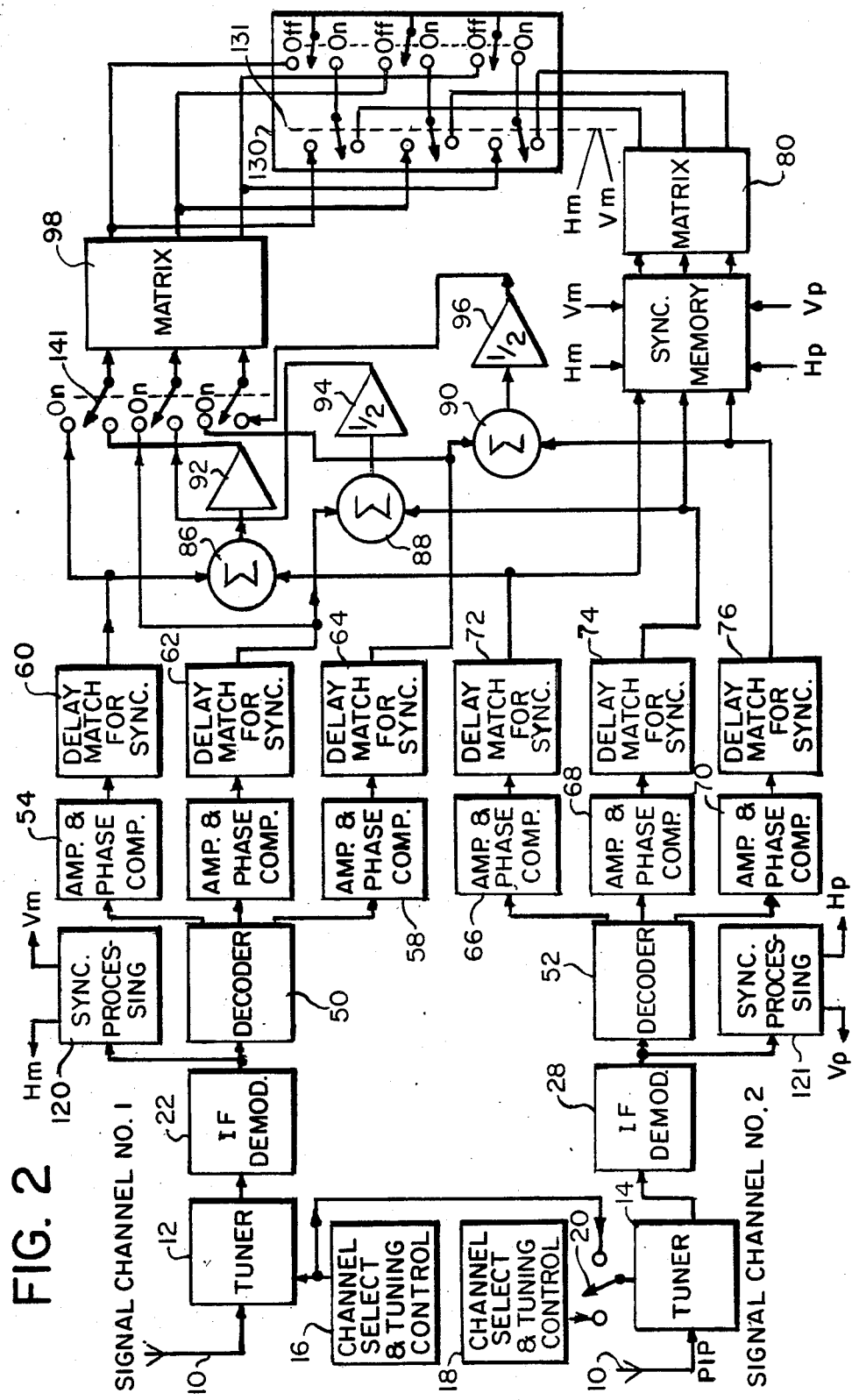
FIG. 2 is a schematic diagram of a second embodiment of the present invention.

An alternate embodiment of the invention is shown in FIG. 2. In FIG. 2, the antenna, tuners and channel selector units, as well as the demodulators are connected as in the embodiment of FIG. 1. However, color decoders 50 and 52 are connected to the outputs of demodulators 22 and 28, respectively. Color decoder 50 furnishes the main channel luminance signal and two color difference signals. Each of these signals is applied to an amplitude and phase compensation stage 54, 56 and 58, respectively, the outputs of these stages being connected to the inputs of delay matching stages 60, 62 and 64, respectively. Similarly, the luminance signal at the output of color decoder 52 is applied to the input of an amplitude and phase compensating stage 66, the red difference signal to an amplitude and phase conpensating stage 68, and the blue difference signal to an amplitude and phase compensating stage 70. The outputs of these amplitude and phase compensating stages are applied to inputs of delay stages 72, 74 and 76, respectively.

When a 3 pole switch 141 is in the "ON" position, the outputs of stages 60, 62, and 64 are directly applied to respective inputs of a matrix 98, where they are matrixed to RGB signals and delivered to a switching stage 131. Switching stage 131 has a ganged 3 pole switch 130 which switches between the main and PIP picture under control of signals Hm and Vm as in the first embodiment when the PIP mode is active. The resultant RGB signals are transmitted to respective outputs of stage 131 when a switch 132 in in the "ON" position. When the 3 pole switches 141 and 132 are in the "OFF" position, the outputs of the divide-by-two stages 92, 94, and 96 are applied to the matrix stage 98 and matrixed to RGB outputs which are then the outputs applied to the display device.

The main difference between the operation of the above-described circuit of FIG. 2 and that of FIG. 1 is that the color decoder is connected in the input processing stage, i.e. at the output of the demodulator. It is therefore necessary to provide amplitude and phase compensating stages as well as delay matching stages for each individual color signal and luminance signal.

It is evident that the present invention can be incorporated into any television receiver having more than one channel and in which, at least some of the time, one of the channels is not in use. The noise reduction benefits can be gained with a minimal increase in the required software or hardware and thus with minimal increase in price.

Although the invention has been illustrated in particular preferred embodiments, it is not intended to be limited thereto. Many variations in operation and construction will readily occur to one skilled in the art and are intended to be encompassed in the invention as set forth in the following claims.

I claim:

1. In a television receiver having display means, first and second tuning means for tuning in a first and second selected one of a plurality of television channels, respectively, processing means coupled to said first and said tuning means for processing first and second television signals received on said first and second selected channels, respectively and for applying processed first and second television signals to said display means to create a first and second television picture, respectively, said television receiver further having user-operable selector switch means having an "on" position signifying desired display of both and first and said second television picture and an "off" position signifying desired display of said first television picture only, and output selector means for applying only said first television signals to said display means when said selector switch means is in said "off" position, noise reduction means comprising means coupled to said selector switch means for automatically tuning said second tuning means to said first selected television channel when said selector switch means is in said "off" position;

combining means connected to said processing means for generating combined signals corresponding to a predetermined combination of said first and second television signals; and additional selector means connected to said combining means and said processing means for substituting said combined signals for said first television signals when said user operable selector switch means is in said "off" position.

2. Television apparatus as set forth in claim 1, wherein said combining means comprises averaging means.

3. Television apparatus as set forth in claim 1, wherein said processing means comprises first and second processing means for, respectively, processing said first and second television signals.

4. Television apparatus as set forth in claim 3, wherein said first processing means comprises initial processing means connected to said first tuning means and said combining means, and final processing means having an input connected to said initial processing means or said combining means when said selector switch means is in said "on" or "off" position, respectively, and an output connected to said additional selector means.

5. Television apparatus as set forth in claim 4, wherein said initial processing means comprises demodulator means connected to said tuning means, amplitude and phase compensation means connected to said demodulator means, and delay matching means connected to said compensation means; and wherein said final processing means comprises color decoder means.

6. Television apparatus as set forth in claim 4, wherein said first initial processing means comprises demodulator means, color decoder means connected to said demodulator means and furnishing color difference signals and, amplitude and phase compensation means connected to said color decoder means for processing said color difference signals;

wherein said combining means comprises a plurality of combining stages each for combining corresponding ones of said color difference signals;

and wherein said final processing means comprises matrix means for generating RGB color signals corresponding to said color difference signals.

* * * * *

UNITED STATES PATENT AND TRADEMARK OFFICE
CERTIFICATE OF CORRECTION

PATENT NO. : 4,682,234
DATED : July 21, 1987
INVENTOR(S) : Saiprasad V. Naimpally It is certified that error appears in the above-identified patent and that said Letters Patent is hereby corrected as shown below:

IN THE CLAIMS

Claim 1, line 12    change "and" (first occurrence) to --said--

Signed and Sealed this

Thirteenth Day of February, 1990

Attest:

JEFFREY M. SAMUELS

Attesting Officer    Acting Commissioner of Patents and Trademarks